(12) United States Patent
Koenig

(10) Patent No.: US 8,187,149 B2
(45) Date of Patent: May 29, 2012

(54) COASTING CONTROL SYSTEMS AND METHODS FOR AUTOMATIC TRANSMISSION

(75) Inventor: John J. Koenig, Howell, MI (US)

(73) Assignee: GM Global Technology Operations LLC

( * ) Notice: Subject to any disclaimer, the term of this patent is extended or adjusted under 35 U.S.C. 154(b) by 497 days.

(21) Appl. No.: 12/503,930

(22) Filed: Jul. 16, 2009

(65) Prior Publication Data

US 2011/0015037 A1    Jan. 20, 2011

(51) Int. Cl.
*F16H 59/74*    (2006.01)
*B60W 10/10*    (2006.01)

(52) U.S. Cl. .......................................... 477/98; 477/115

(58) Field of Classification Search ...................... 477/98
See application file for complete search history.

(56) References Cited

U.S. PATENT DOCUMENTS

| 4,817,473 | A | * | 4/1989 | Baltusis et al. | 477/65 |
| 6,095,945 | A | * | 8/2000 | Graf | 477/97 |
| 2002/0035013 | A1 | * | 3/2002 | Saito | 477/120 |

FOREIGN PATENT DOCUMENTS

| DE | 10307462 A1 | 2/2003 |
| DE | 102004009833 A1 | 2/2004 |

* cited by examiner

*Primary Examiner* — Edwin A Young

(57) ABSTRACT

A coasting control system for a vehicle includes a coasting monitoring module and a glide mode activation module. The coasting monitoring module determines whether the vehicle is in a coasting state. The glide mode activation module operates a transmission in a freewheeling state based on a determination that the vehicle is in the coasting state.

16 Claims, 5 Drawing Sheets

US 8,187,149 B2

COASTING CONTROL SYSTEMS AND METHODS FOR AUTOMATIC TRANSMISSION

FIELD

The present disclosure relates to automatic transmission systems, and more particularly to coasting control systems and methods to improve fuel economy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle coasting may occur when a drop in throttle position and engine load is detected. A deceleration fuel cut-off (DFCO) strategy has been used sometimes to cut fuel flow to the engine while the transmission is engaged in gear to improve fuel economy. The DFCO strategy, however, undesirably reduces vehicle speed. Moreover, the DFCO strategy can adversely affect performance of a catalytic converter when fuel supply resumes.

SUMMARY

A coasting control system for a vehicle includes a coasting monitoring module and a glide mode activation module. The coasting monitoring module determines whether the vehicle is in a coasting state. The glide mode activation module operates a transmission in a freewheeling state based on a determination that the vehicle is in the coasting state.

A method of coasting a vehicle includes determining whether the vehicle is in a coasting state and operating a transmission in a freewheeling state based on a determination that the vehicle is in the coasting state.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
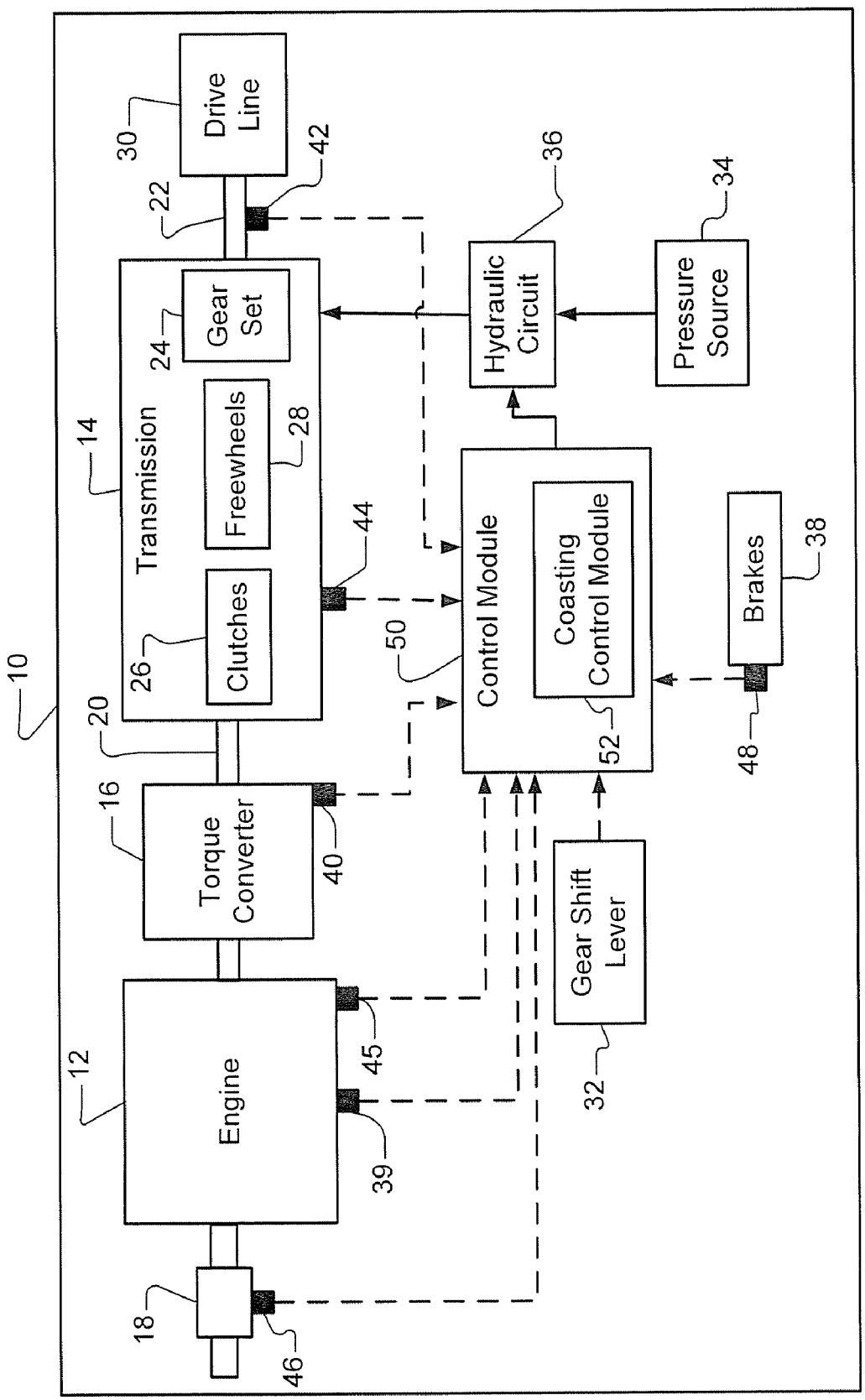
FIG. 1 is a functional block diagram of a vehicle that includes a coasting control module in accordance with the teachings of the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A coasting control system according to the present disclosure transitions an automatic transmission to operate in a glide mode when a coasting condition is detected. The glide mode is devised to automatically eliminate engine braking and thereby promote improved coasting performance. In the glide mode, the automatic transmission is in a freewheeling state. When the transmission is in the freewheeling state, the engine speed is more quickly reduced to an idle speed and the deceleration rate is greatly reduced as compared with deceleration fuel cut off (DFCO) mode. Therefore, fuel economy is improved.

Referring now to FIG. 1, a vehicle 10 includes an engine 12 that drives a transmission 14 through a torque converter 16. Air is drawn into the engine 12 through a throttle 18. The air is mixed with fuel and combusted within cylinders (not shown) of the engine 12 to produce engine torque. The torque converter 16 transmits the engine torque to the transmission 14 via an input shaft 20. The transmission 14 may be a multi-speed automatic clutch-to-clutch transmission that drives an output shaft 22 based on the engine torque. As can be appreciated, the transmission 14 may be any type of automatic transmission including, but not limited to freewheel transmissions and continuously variable transmissions (CVTs). The transmission 14 may include gear sets 24, clutches 26, and freewheels 28.

The output shaft 22 drives a driveline 30 of the vehicle 10. A gear shift lever 32 enables an operator to set the transmission at a desired operating range including, but not limited to, park, reverse, neutral, and one or more forward drive positions. Speed and torque relationships between the engine 12 and the driveline 30 are controlled by hydraulically engaging the gear set 24 to a suitable one of the clutches 26. Pressurized fluid is provided to the clutches 26 from a regulated hydraulic pressure source 34. Hydraulic circuit 36 includes solenoids and control valves (not shown) that regulate pressure applied to the clutches 26 and the freewheels 28 by supplying or discharging fluid to/from the clutches 26 and freewheels 28. Brakes 38 act to apply pressure to the driveline 24 to stop the momentum of the vehicle 10 during idle conditions. The clutches 26 are selectively engaged to provide neutral, a plurality of forward drive ratios, and one reverse drive ratio.

An engine speed sensor 39 senses engine speed and generates an engine speed signal. A turbine speed sensor 40 senses a rotational speed of a turbine in the torque converter 16 and generates a turbine speed signal. An output speed sensor 42 senses a rotational speed of the output shaft 22 and generates an output speed signal. A temperature sensor 44 senses a temperature of the transmission fluid and generates a transmission temperature signal. An engine coolant temperature sensor 45 senses an engine coolant temperature and generates a signal indicative of the engine coolant temperature. A throttle position sensor 46 senses a position of the throttle 18 and generates a throttle position signal. A brake sensor 48 senses the status of the brakes 38 and generates a brake status signal. A control module 50 receives the above-mentioned signals and controls the transmission 14 accordingly.

The control module 50 includes a coasting control module 52 that controls the transmission 14 during coasting. The coasting control module 52 transitions an automatic transmission to operate in a freewheeling state when a coasting condition is detected to improve fuel economy.

Figure 2:
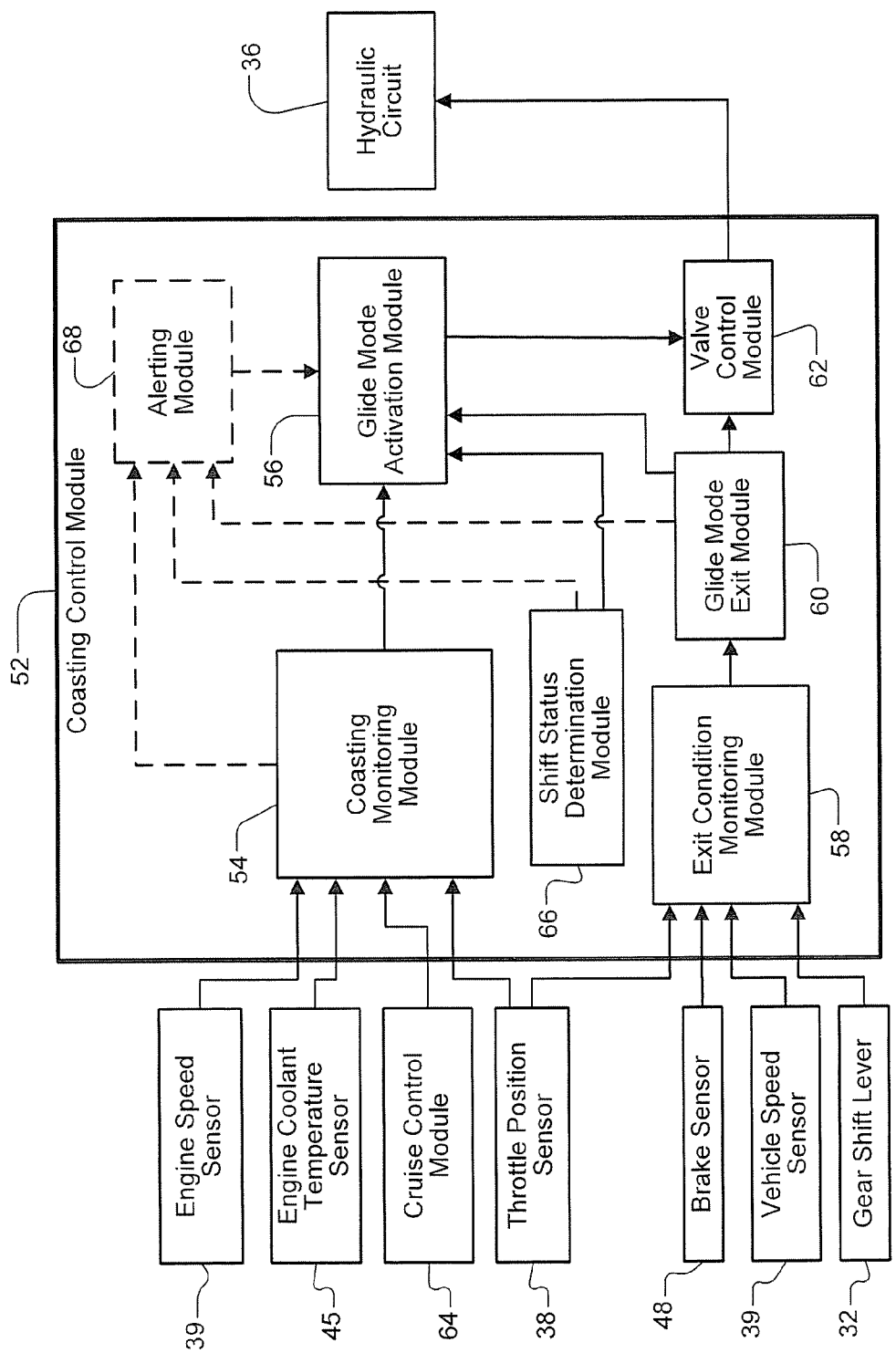
FIG. 2 is a functional block diagram of a coasting control module in accordance with the teachings of the present disclosure.

Referring to FIG. 2, the coasting control module 52 includes a coasting monitoring module 54, a glide mode activation module 56, an exit condition monitoring module 58, a glide mode exit module 60, and a valve control module 62. The coasting monitoring module 54 communicates with the engine speed sensor 39, the engine coolant temperature sensor 45, a cruise control module 64, and the throttle position sensor 38.

The coasting monitoring module 54 determines whether a coasting condition is present based on signals from the sensors 38, 39, 45, and the cruise control module 64. For example, a coasting condition may be present when engine coolant temperature is above a threshold temperature, when the engine speed is above a threshold speed, when the throttle position is below a threshold percentage, and when a cruise control module 64 is off. When each of these conditions is present, the coasting monitoring module 54 sends a signal to the glide mode activation module 56.

The glide mode activation module 56 also receives signals from a shift status determination module 66 and a glide mode exit module 60. The shift status determination module 66 determines the shift status of the transmission 14. For example, the glide mode exit module 60 may include a counter that records an elapsed time after the last glide mode is exited.

Glide mode activation may depend on the coasting condition, the shift status of the transmission, and the elapsed time after the last glide mode. When the coasting condition is detected, the transmission 14 is in a predetermined gear (for example only, the fourth gear), and the elapsed time from the last glide mode exceeds a threshold time, the glide mode activation module 56 activates the glide mode. The glide mode activation module 56 commands the transmission 14 to transition to operate in the glide mode. In the glide mode, the transmission 14 is in a freewheeling (i.e., overrunning) state.

To transition the transmission 14 to the glide mode, the glide mode activation module 56 commands a downshift from the fourth gear to a second or third gear, depending on the transmission configuration. The glide mode activation module 56 determines a desired freewheel based on, for example, an attained gear ratio and/or the transmission configuration. An attained gear ratio is a gear ratio of the transmission when the coasting condition is detected. Downshifting from the fourth gear to the second gear or the third gear enables an input sprag of the transmission 14 to freewheel or coast. It is understood and appreciated that the glide mode activation module 56 may command a glide mode from a gear other than the fourth gear, depending on the configuration of the transmission.

In response to the command from the glide mode activation module 56, the valve control module 62 controls solenoids and control valves (not shown) in the hydraulic circuits 36 to apply hydraulic pressure to the desired freewheel 28. The gear set 24 is thus engaged to the desired freewheel 28 and enters a freewheeling state. In the glide mode, the engine 12 remains coupled to the torque converter 16, the pump and turbine of the torque converter 16 remain coupled, and the gear set 24 is disengaged from the torque converter 16 due to the freewheel 28. The gear set 24 is decoupled from the engine 12 and is in neutral. Therefore, the engine 12 can reduce engine speed independent of the transmission 14.

Figure 3:
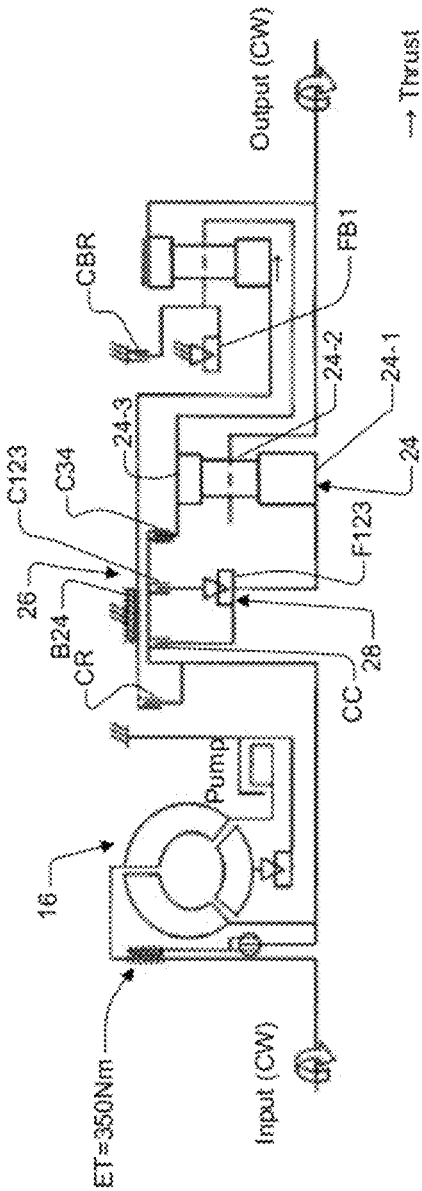
FIG. 3 is a power flow diagram of a powertrain for an exemplary transmission architecture when the transmission is in a fourth gear in accordance with the teachings of the present disclosure.

Referring to FIG. 3, a rotating clutch C34 and a band B24 are engaged when the exemplary transmission architecture is in the fourth gear. A rotating clutch C123 is engaged but no torque is transmitted via the rotating clutch C123. The rotating clutch C123 is connected to a freewheel F123. The engine torque is transmitted to the gear set 24 via, the rotating clutch C123 and the rotating clutch C34. The gear set 24 includes a sun gear 24-1, a ring gear 24-2 and planetary gears 24-3.

Figure 4:
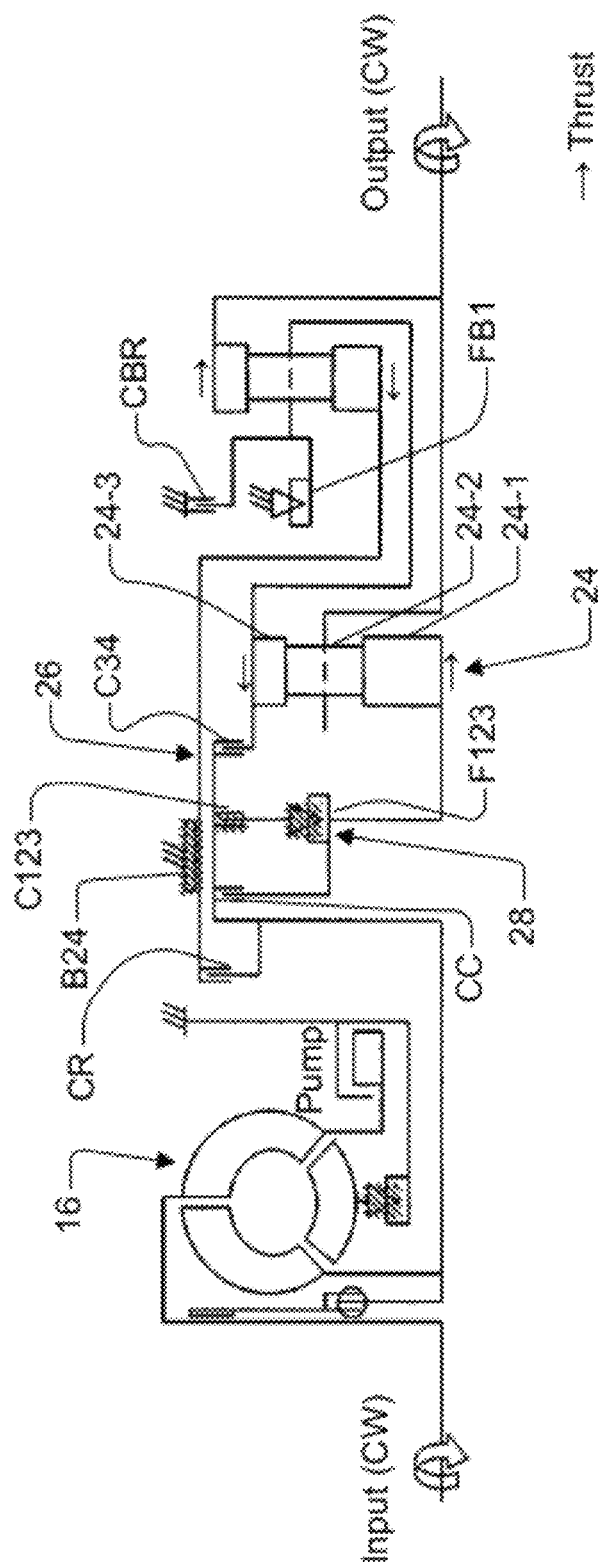
FIG. 4 is a power flow diagram of a powertrain for an exemplary transmission architecture when a transmission is in a second gear in accordance with the teachings of the present disclosure.

Referring to FIG. 4, to achieve a freewheeling state in the exemplary transmission architecture, the transmission 14 is downshift to the second gear to engage the rotating clutch C123 and the band B24. When the rotating clutch C123 and the band B24 are engaged, the engine torque may be transmitted to the gear set 24 via the rotating clutch C123 and the freewheel F123 when the speed of the rotating clutch C123 is greater than the speed of the sun gear 24-2. The freewheel F123 is a one-way clutch and allows for torque transmission in one direction (i.e., from engine 12 to gear set 24). In addition, to transmit torque from the engine 12 to the gear set 24 via the freewheel F123, the rotating clutch C123 must have a speed equal to or greater than that of the sun gear 24-1. When the engine speed is reduced during coasting, the engine torque is not transmitted to the gear set 24 via the freewheel F123. Therefore, the output speed of the transmission 14 can be gradually reduced without being affected by the engine speed. The engine speed can be more quickly reduced without being constrained by the speed of the gear set 24.

It is understood and appreciated that the transmission architecture as shown in FIGS. 3 and 4 is only for illustrative purposes. The glide mode according to the present disclosure may be embodied in any types of transmission architectures without departing from the scope of the present disclosure. For example, a transmission may be transitioned to a glide mode when the transmission input is disconnected from the transmission output and the engine speed can be controlled independently of the transmission output speed. A downshift may or may not be needed to transition the transmission to the glide mode.

Fuel economy is improved when the engine 12 runs in the glide mode during coasting in comparison to a normal coasting mode (for example, a deceleration fuel cut-off mode). In the normal coasting mode, the engine 12 is coupled to the transmission 14 and the engine speed is diminished directly proportional to the vehicle speed. According to the present disclosure, because the engine 12 is decoupled from the transmission 14, the engine speed can be reduced more quickly and may diminish in a significantly shorter time to an idle speed as compared to the normal coasting mode. When engine speed is reduced more quickly, more fuel is saved.

In addition, vehicle speed in the glide mode diminishes at a lower rate than that in the normal coasting mode. For example, the transmission 14 is decoupled from the engine 12 in the glide mode. Accordingly, the freewheeling of the transmission 14 provides a better "glide" as opposed to the normal coasting mode, where the transmission 14 is coupled to the engine 12. Therefore, the coasting time is increased by activating the glide mode. The increased coasting time leads to less frequent application of the accelerator pedal to accelerate the vehicle, thereby improving fuel economy.

The exit condition monitoring module 58 monitors engine and vehicle operating conditions to determine whether a glide mode is no longer desirable. A glide mode exit condition is present when the throttle position is above a second threshold percentage, when a gear shift lever is moved, when a brake pedal is depressed, when the vehicle speed is below a threshold speed, and/or when deceleration rate exceeds a threshold. When one or more of the above-mentioned conditions is present, the glide mode exit module 60 commands an upshift from the second or third gear to the fourth gear. In response to the command from the glide mode exit module 60, the valve control module 62 operates the solenoids and control valves in the hydraulic circuit 36 to discharge pressure from the freewheel 28 and supply pressure to a desired clutch. When the gear set 24 is engaged to the desired clutch, the engine torque is transmitted from the engine 12, through the torque converter 16, the desired clutch 26 to the gear set 24. The transmission 14 then operates in the fourth gear.

During glide mode exit, the engine speed may return to a speed synchronous with the commanded gear. The smooth return to synchronous may be achieved in one of several ways. For example, the glide mode exit module 60 may employ a throttle management strategy to increase the engine speed until the engine speed becomes synchronous with the commanded gear. The engine speed may be determined according to a throttle management strategy. The throttle management strategy involves a direct control of the engine speed by controlling the throttle opening independently of the depression of an accelerator pedal. The throttle opening rate may be adjusted until the throttle reaches a desired value or is released. The increase in throttle position completes when the pressure is equal to or exceeds a normal pressure associated with the current powertrain condition. Normal control of the throttle by the accelerator pedal may resume when the engine speed is synchronous with the transmission speed.

Alternatively, the glide mode may be triggered manually by a driver. For example only, the glide mode activation module 56 may communicate with an alerting module 68. The alerting module 68 may communicate with the coasting monitoring module 54, the shift status module 66 and the glide mode exit module 60. When a coasting condition is detected and the status of the transmission 14 is appropriate for a glide mode, the alerting module 68 is activated. The alerting module 68 may include a visual indicator and an ECO button. For example only, the visual indicator may include a light emitting diode (LED) or a control panel icon. When the alerting module 68 is activated, the visual indicator may indicate that a glide mode is appropriate. By depressing the ECO button, the driver may activate the glide mode activation module 56 to transition the transmission to operate in the glide mode.

Figure 5:
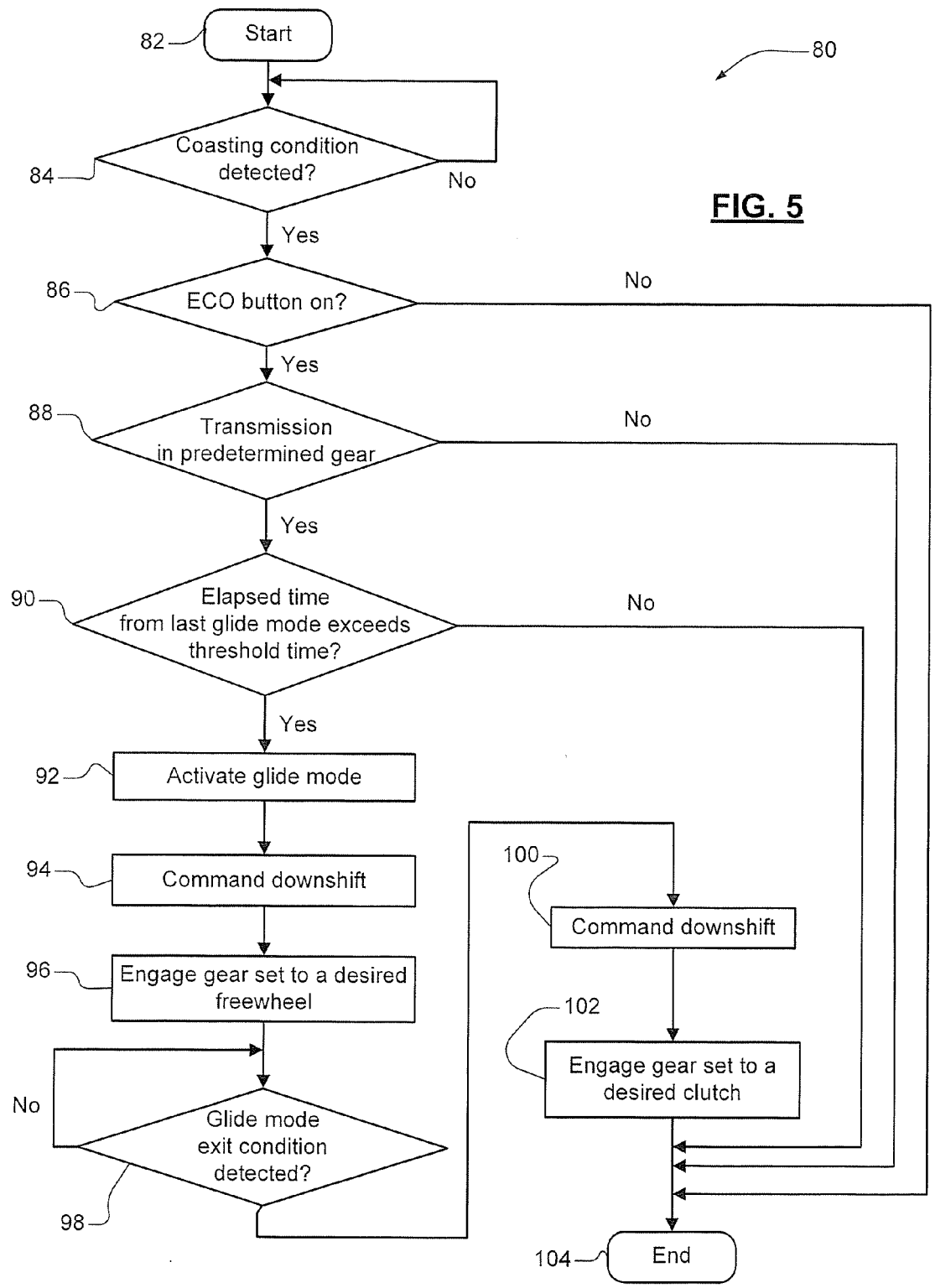
FIG. 5 is a flow diagram of a method of coasting a vehicle in accordance with the teachings of the present disclosure.

Referring to FIG. 5, a method 80 of coasting a vehicle starts in step 82. The coasting monitoring module 48 monitors engine conditions to determine whether a coasting condition is present in step 84. When the coasting condition is present, the coasting control module 52 determines whether an ECO button is on in step 86. The shift status determination module 66 determines whether the transmission is in a predetermined gear in step 88. The glide mode exit mode 60 determines whether the elapsed time from last glide mode exceeds a threshold time in step 90. When the ECO button is on, when the transmission 14 is in the fourth gear, and when the elapsed time from last glide mode exceeds a threshold time, the glide mode activation module 56 activates a glide mode in step 92. The glide mode activation module 56 determines a desired freewheel and commands a downshift in step 94. The valve control module 62 then controls the solenoids and control valves in the hydraulic circuit 36 to engage the gear set 24 to the desired freewheel in step 96.

The exit condition monitoring module 58 monitors the engine and vehicle conditions to determine whether a glide mode exit condition is present in step 98. When the exit conditions is present, the glide mode exit module 60 commands an upshift in step 100. The valve control module 62 controls the solenoids and the control valves in the hydraulic circuit 36 to engage the gear set 24 to a desired clutch 26 to transition the transmission 14 to the fourth gear in step 102.

When the ECO button is off in step 86, when the transmission 14 is not in the fourth gear in step 88, or when the elapsed time from the last glide mode does not exceed the threshold time in step 90, the glide mode activation module 56 does not activate the glide mode and the method 80 goes to step 104. The method 80 ends in step 104.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A coasting control system for a vehicle comprising:
   a coasting monitoring module that determines whether the vehicle is in a coasting state; and
   a glide mode activation module that operates a transmission in a freewheeling state based on a determination that the vehicle is in the coasting state,
   wherein the coasting monitoring module determines whether the vehicle is in the coasting state based on engine speed, throttle position, and engine coolant temperature.
2. The coasting control system of claim 1 wherein the glide mode activation module commands a gear set of the transmission to engage a freewheel to achieve the freewheeling state.
3. The coasting control system of claim 2 wherein the glide mode activation module commands a rotating gear to engage the freewheel to achieve the freewheeling state.
4. The coasting control system of claim 1 wherein the coasting monitoring module determines that the vehicle is in the coasting state when the engine coolant temperature is above a threshold temperature, when the engine speed is above a threshold speed, and when the throttle position is below a threshold percentage.
5. A coasting control system for a vehicle comprising:
   a coasting monitoring module that determines whether the vehicle is in a coasting state; and
   a glide mode activation module that operates a transmission in a freewheeling state based on a determination that the vehicle is in the coasting state,
   wherein the glide mode activation module commands a downshift when the coasting monitoring module determines that the vehicle is in the coasting state.
6. The coasting control system of claim 5 wherein the glide mode activation module commands a downshift from a fourth gear to a second or third gear.
7. A coasting control system for a vehicle comprising:
   a coasting monitoring module that determines whether the vehicle is in a coasting state;
   a glide mode activation module that operates a transmission in a freewheeling state based on a determination that the vehicle is in the coasting state; and
   a glide mode exit module that deactivates a glide mode when a glide mode exit condition is detected,
   wherein the glide mode exit module commands an upshift when the exit condition is detected.

8. The coasting control system of claim 7 wherein the glide mode exit condition is detected when a throttle position exceeds a second threshold percentage, when a brake is depressed, when a gear shift lever is moved, when vehicle speed is below a second threshold speed, or when the vehicle decelerates at a rate faster than a threshold rate.

9. The coasting control system of claim 7 wherein the glide mode exit module controls a throttle to increase engine speed independently of depression of an accelerator pedal.

10. The coasting control system of claim 9 wherein the glide mode exit module controls the throttle to increase the engine speed independently of depression of an accelerator pedal until the engine speed becomes synchronous with a commanded gear.

11. A method of coasting a vehicle comprising:
determining whether the vehicle is in a coasting state;
operating a transmission in a freewheeling state based on a determination that the vehicle is in the coasting state; and
determining whether the vehicle is in the coasting state based on engine speed, throttle position, and engine coolant temperature.

12. The method of claim 11 wherein the vehicle is in the coasting state when the engine coolant temperature is above a threshold temperature, when the engine speed is above a threshold speed, and when the throttle position is below a threshold percentage.

13. A method of coasting a vehicle comprising:
determining whether the vehicle is in a coasting state;
operating a transmission in a freewheeling state based on a determination that the vehicle is in the coasting state; and
downshifting the transmission prior to operating the transmission in the freewheeling state.

14. The method of claim 13 further comprising downshifting the transmission from a fourth gear to a second gear based on the determination that the vehicle is in the coasting state.

15. A method of coasting a vehicle comprising:
determining whether the vehicle is in a coasting state;
operating a transmission in a freewheeling state based on a determination that the vehicle is in the coasting state;
determining whether the vehicle is in a glide mode exit condition; and
upshifting the transmission from the freewheeling state based on a determination that the vehicle is in the glide mode exit condition.

16. The method of claim 15 wherein the glide mode exit condition is present when a throttle position exceeds a second threshold percentage, when a brake is depressed, when a gear shift lever is moved, when vehicle speed is below a second threshold speed, or when the vehicle decelerates at a rate faster than a threshold rate.

* * * * *